US009723962B2

(12) United States Patent
Yoon et al.

(10) Patent No.: US 9,723,962 B2
(45) Date of Patent: Aug. 8, 2017

(54) DUST INFLOW SENSING UNIT AND ROBOT CLEANER HAVING THE SAME

(75) Inventors: Sang Sik Yoon, Suwon-si (KR); Jun Pyo Hong, Suwon-si (KR); Hwi Chan Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 930 days.

(21) Appl. No.: 13/200,369

(22) Filed: Sep. 23, 2011

(65) Prior Publication Data

US 2012/0079670 A1 Apr. 5, 2012

(30) Foreign Application Priority Data

Oct. 5, 2010 (KR) .................. 10-2010-0097065

(51) Int. Cl.
*A47L 9/28* (2006.01)
*G05D 1/02* (2006.01)
(52) U.S. Cl.
CPC ............ *A47L 9/2815* (2013.01); *A47L 9/2847* (2013.01); *A47L 9/2852* (2013.01); *A47L 9/2857* (2013.01); *A47L 9/2894* (2013.01); *G05D 1/021* (2013.01); *G05D 1/0274* (2013.01); *A47L 2201/04* (2013.01); *A47L 2201/06* (2013.01); *G05D 2201/0203* (2013.01)
(58) Field of Classification Search
CPC .... A47L 9/2815; A47L 9/2847; A47L 9/2852; A47L 9/2857; A47L 9/2894; A47L 2201/04; A47L 2201/06; G05D 1/021; G05D 1/0274; G05D 2201/0203

USPC .............................. 15/319, 339, 340.1, 340.3
See application file for complete search history.

(56) References Cited

U.S. PATENT DOCUMENTS

| 5,163,202 | A | * | 11/1992 | Kawakami et al. ............ 15/319 |
| 5,819,367 | A | * | 10/1998 | Imamura ......................... 15/339 |
| 6,956,348 | B2 | * | 10/2005 | Landry ................. A47L 9/2805 15/319 |
| 2005/0166354 | A1 | * | 8/2005 | Uehigashi ............. A47L 9/2805 15/319 |
| 2005/0166355 | A1 | * | 8/2005 | Tani ...................... A47L 9/2805 15/319 |
| 2005/0171644 | A1 | | 8/2005 | Tani |

FOREIGN PATENT DOCUMENTS

| DE | 102 61 787 B3 | 1/2004 |
| DE | 10 2007 010 979 B3 | 5/2008 |
| DE | 10 2007 036 157 A1 | 2/2009 |

(Continued)

OTHER PUBLICATIONS

European Search Report dated Dec. 10, 2013 issued in corresponding European Patent Application 11183741.5.

(Continued)

*Primary Examiner* — David Redding
(74) *Attorney, Agent, or Firm* — Staas & Halsey LLP

(57) ABSTRACT

A dust inflow sensing unit and a robot cleaner having the same. The dust inflow sensing unit includes a light emitting element to emit a beam having a transmission region, a light receiving element having a reception region overlapping the transmission region of the light emitting element, and a guide member to restrict the reception region of the light receiving element to a designated range until the reception region reaches the light emitting element.

12 Claims, 14 Drawing Sheets

(56) References Cited

FOREIGN PATENT DOCUMENTS

| | | |
|---|---|---|
| EP | 0 347 223 A2 | 12/1989 |
| EP | 0 861 629 | 9/1998 |
| EP | 0 861 629 A1 | 9/1998 |
| EP | 0 904 723 A1 | 3/1999 |
| JP | 10-94499 | 4/1998 |
| JP | 2000-37333 | 2/2000 |
| JP | 2005-211366 | 8/2005 |
| KR | 10-2005-0012038 | 1/2005 |
| KR | 10-20050073082 | 7/2005 |
| KR | 10-0556836 | 2/2006 |
| KR | 10-2009-0061462 | 6/2009 |

OTHER PUBLICATIONS

Chinese Office Action dated Apr. 3, 2015 from Chinese Patent Application No. 201110305268.2, 10 pages.
Korean Office Action dated Oct. 21, 2015 from Korean Patent Application No. 10-2015-0111680, 32 pages.
Chinese Office Action dated Dec. 3, 2015 from Chinese Patent Application No. 201110305268.2, 11 pages.
European Office Action dated Jan. 3, 2017 from European Patent Application No. 11183741.5, 42 pages.
Chinese Office Action dated Feb. 6, 2017 from Chinese Patent Application No. 201110305268.2, 4 pages.
Korean Office Action dated Apr. 28, 2016, from Korean Patent Application No. 10-2015-0111680, 30 pages including partial translation.
European Patent Office Communication regarding Summons to Attend Oral Proceedings dated May 2, 2016, from European Patent Application No. 11183741.5, 4 pages.

\* cited by examiner

DUST INFLOW SENSING UNIT AND ROBOT CLEANER HAVING THE SAME

CROSS-REFERENCE TO RELATED APPLICATIONS

This application claims the priority benefit of Korean Patent Application No. 2010-0097065, filed on Oct. 5, 2010 in the Korean Intellectual Property Office, the disclosure of which is incorporated herein by reference.

BACKGROUND

1. Field

Embodiments relate to a dust inflow sensing unit of a robot cleaner which improves a dust sensing capacity.

2. Description of the Related Art

An autonomously traveling robot is an apparatus which performs a designated task while traveling in an arbitrary region without manipulation of a user. The robot may perform considerably autonomous traveling, and such autonomous traveling may be achieved in various methods. For example, the robot may travel in an arbitrary region along a predetermined route, or may travel in the arbitrary region without the predetermined route.

A robot cleaner is an apparatus which cleans a floor while traveling in a region to be cleaned without manipulation of a user. In more detail, the robot cleaner is used in vacuum-cleaning and scrubbing at homes. Here, dust means soil particles, dirt, powder particles, debris and other dust particles which are collectable by vacuum cleaners or automatic or semi-automatic cleaning apparatuses.

SUMMARY

Therefore, it is an aspect to provide a dust inflow sensing unit which optimizes a dust sensing capacity using a simple structure and a robot cleaner having the same.

Additional aspects will be set forth in part in the description which follows and, in part, will be apparent from the description, or may be learned by practice of the invention.

In accordance with one aspect, a robot cleaner includes a main body, a drive unit to drive the main body, a brush drum unit provided on the main body to form a dust inflow channel, and a dust inflow sensing unit to sense dust flowing into the main body through the dust inflow channel of the brush drum unit, wherein the dust inflow sensing unit includes a light emitting part having a transmission region to emit a beam, and a light receiving part having a reception region to overlap the transmission region and the reception region is restricted to a designated range.

The brush drum unit may include a housing having a first opening and a second opening so as to form the dust inflow channel, and the light emitting part and the light receiving part may be installed in the second opening so as to be opposite to each other.

The robot cleaner may further include a dust container provided with an inflow hole to store the dust flowing into the main body through the dust inflow channel of the brush drum unit, and the light emitting part and the light receiving part may be installed in the inflow hole so as to be opposite to each other.

The light receiving part may include a light receiving element and a light receiving guide member to restrict the reception region of the light receiving element.

The light receiving guide member may enable the width of the reception region of the light receiving element to be gradually decreased in a direction toward the light emitting part.

The width of the reception region of the light receiving element may be smaller than that of the transmission region of the light emitting element at a position at which the light emitting element is located.

The light receiving guide member may enable the width of the reception region of the light receiving element to be uniformly maintained in a direction toward the light emitting part.

The width of the reception region of the light receiving element may be equal to that of the transmission region of the light emitting element at a position at which the light emitting element is located.

The light receiving guide member may enable the width of the reception region of the light receiving element to be gradually increased in a direction toward the light emitting part.

The width of the reception region of the light receiving element may be greater than that of the transmission region of the light emitting element at a position at which the light emitting element is located.

The light receiving guide member may include a case to receive the light receiving element and a through hole formed on the case so that the beam of the light emitting element is received by the light receiving element.

The robot cleaner may further include a control unit to determine an area in which dust is sensed by the dust inflow sensing unit and an area in which dust is not sensed by the dust inflow sensing unit, and the control unit may control the robot cleaner so as to divisionally clean the area in which dust is sensed by the dust inflow sensing unit and the area in which dust is not sensed by the dust inflow sensing unit.

The robot cleaner may further include a control unit to determine an area in which dust is sensed by the dust inflow sensing unit and an area in which dust is not sensed by the dust inflow sensing unit, and the control unit may control the robot cleaner so as to more repeatedly clean the area in which dust is sensed by the dust inflow sensing unit than the area in which dust is not sensed by the dust inflow sensing unit.

The robot cleaner may further include a control unit to determine an area in which dust is sensed by the dust inflow sensing unit and an area in which dust is not sensed by the dust inflow sensing unit, the brush drum unit may include a brush unit provided in the dust inflow channel, and the control unit may increase rotary force of the brush unit in the area in which dust is sensed by the dust inflow sensing unit.

The robot cleaner may further include an air blowing unit to provide suction force to the dust inflow channel of the brush drum unit and a control unit to determine an area in which dust is sensed by the dust inflow sensing unit and an area in which dust is not sensed by the dust inflow sensing unit, and the control unit may increase suction force of the air lowing unit in the area in which dust is sensed by the dust inflow sensing unit.

In accordance with another aspect, a dust inflow sensing unit to sense dust flowing into a cleaner includes a light emitting element having a transmission region to emit a beam, a light receiving element having a reception region to overlap the transmission region of the light emitting element, and a light receiving guide member to restrict the reception region of the light receiving element to a designated range until the reception region reaches the light emitting element.

In accordance with another aspect, a dust inflow sensing unit to sense dust flowing into a cleaner includes a light emitting element having a transmission region to emit a beam, a light receiving element having a reception region to overlap the transmission region of the light emitting element, a light emitting guide member to restrict the transmission region of the light emitting element to a designated range until the transmission region reaches the light receiving element, and a light receiving guide member to restrict the reception region of the light receiving element to a designated range until the reception region reaches the light emitting element.

In accordance with a further aspect, a dust inflow sensing unit to sense dust flowing into a cleaner includes a light emitting element having a transmission region to emit a beam, a light receiving element having a reception region to overlap the transmission region of the light emitting element, and a light emitting guide member to restrict the transmission region of the light emitting element to a designated range until the transmission region reaches the light receiving element.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
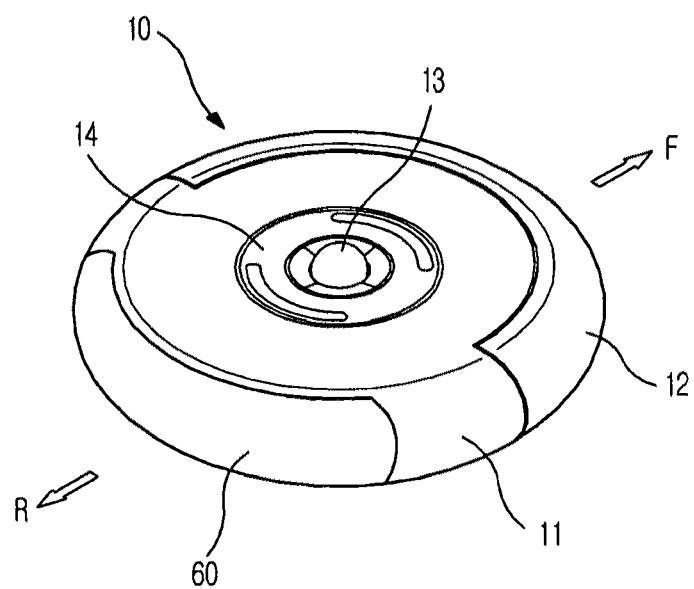
FIG. 1 is a perspective view of a robot cleaner in accordance with one embodiment.

Reference will now be made in detail to the embodiments, examples of which are illustrated in the accompanying drawings, wherein like reference numerals refer to like elements throughout.

Hereinafter, a dust inflow sensing unit and a robot cleaner having the same in accordance with each of respective embodiments will be described in detail with reference to the accompanying drawings.

Figure 2:
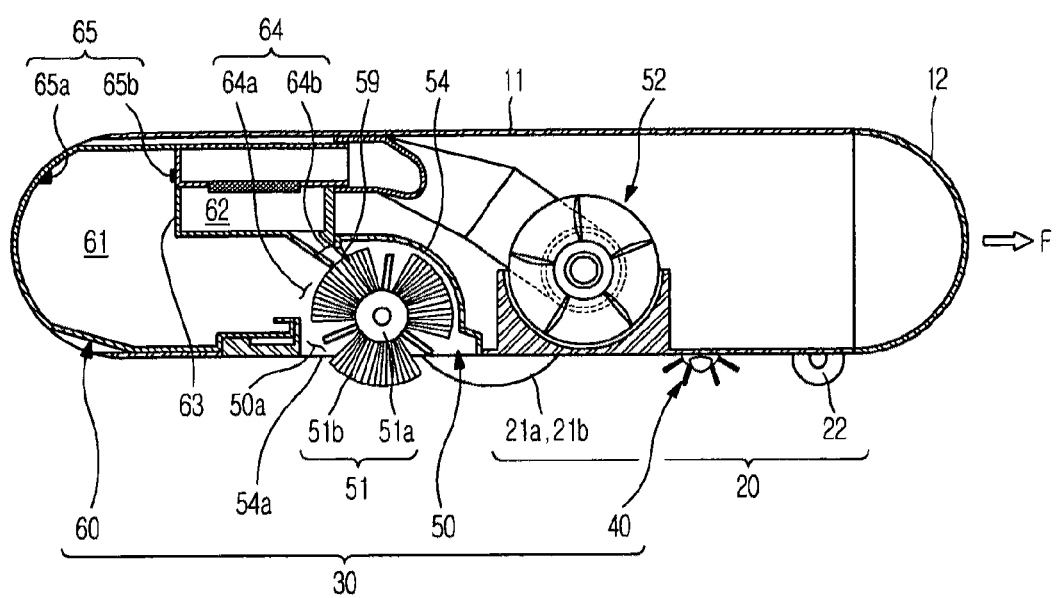
FIG. 2 is a cross-sectional view of the robot cleaner in accordance with the embodiment.
Figure 3:
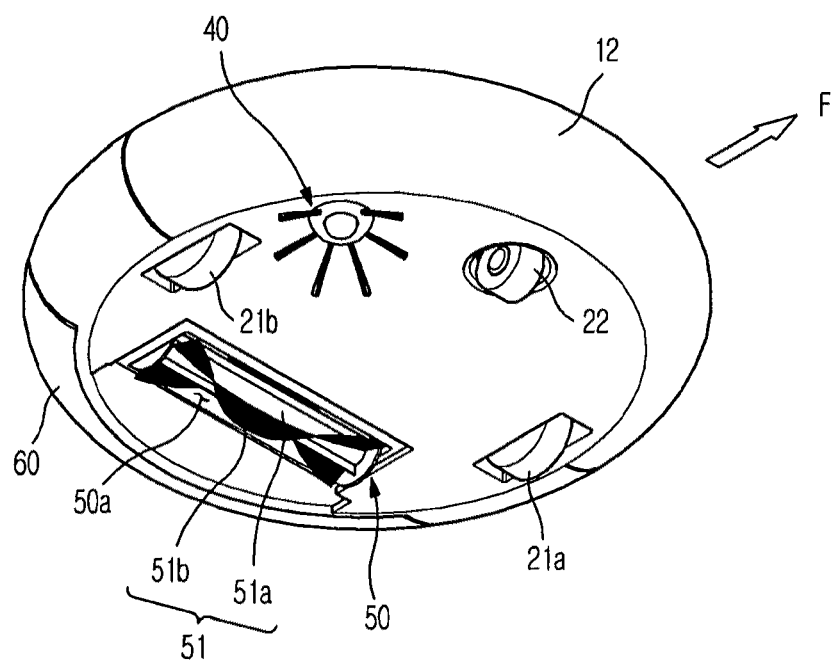
FIG. 3 is a bottom perspective view of the robot cleaner in accordance with the embodiment.

FIG. 1 is a perspective view of a robot cleaner in accordance with one embodiment, FIG. 2 is a cross-sectional view of the robot cleaner in accordance with the embodiment, and FIG. 3 is a bottom perspective view of the robot cleaner in accordance with the embodiment.

As shown in FIGS. 1 to 3, a robot cleaner 10 in accordance with this embodiment includes a main body 11, a drive unit 20, a cleaning unit 30, and a control unit (not shown).

The main body 11 may have various shapes. For example, the main body 11 is formed in a circular shape. The circular main body 11 has a uniform radius of rotation, thus avoiding contact with a surrounding obstacle and easily changing its direction. Further, the circular main body 11 prevents the main body 11 from being caught on the surrounding obstacle during traveling.

Various components to perform a cleaning task, i.e., the drive unit 20, the cleaning unit 30, various sensors 12 and 13, a display unit 14, and the control unit (not shown), may be installed on the main body 11.

The drive unit 20 allows the main body 11 to travel in a region to be cleaned. The drive unit 20 includes left and right drive wheels 21a and 21b and a caster 22. The left and right drive wheels 21a and 21b receive power from motors (not shown). Further, the left and right drive wheels 21a and 21b are mounted at the central region of the lower portion of the main body 11, and the caster 22 is mounted at the front region of the lower portion of the main body 11, thereby allowing the main body 11 to maintain a stable pose.

The left and right drive wheels 21a and 21b and the caster 22 may be integrated into one assembly which is detachably mounted on the main body 11.

The cleaning unit 30 removes dust from a floor on which the main body 11 is placed and the surroundings thereof. The cleaning unit 30 includes a side brush 40, a brush drum unit 50, and a dust container 60.

The side brush 40 is rotatably mounted at one side of the edge of the lower surface of the main body 11. Here, the side brush 40 is disposed at a position deviated diagonally from the central region of the main body 11 in the forward direction F of the man body 11.

The side brush 40 moves dust located at the surroundings of the main body 11 to the floor on which the main body 11 is placed. A cleaning range by the side brush 40 may be expanded to the surroundings of the floor on which the main body 11 is placed. Particularly, the side brush 40 may remove dust from a corner which is a boundary between the floor and a wall.

The brush drum unit 50 is mounted at a position deviated from the central region of the lower surface of the main body 11. That is, the brush drum unit 50 is mounted at a position deviated from the left and right drive wheels 21a and 21b installed at the central region of the lower surface of the main body 11 in the rearward direction R of the main body 11.

The brush drum unit 50 removes dust from the floor on which the main body 11 is placed. The brush drum unit 50 includes a dust inflow channel 50a to form a dust inflow route, and a brush unit 51 provided in the dust inflow channel 50a to sweep dust off the floor.

The brush unit 51 includes a roller 51a and a brush 51b buried under the outer circumferential surface of the roller 51a. The roller 51a receives power supplied from a motor 56

(with reference to FIG. 4), and as the roller 51*a* is rotated, the brush 51*b* agitates dust on the floor. The roller 51*a* may be formed of a rigid body and is not limited thereto. The brush 51*b* may be made of various materials having elasticity.

In order to maintain uniform cleaning performance, the brush unit 51 is controlled to have constant velocity. The rotating velocity of the brush unit 51 if a non-smooth floor surface, for example, such as a carpet, is cleaned, may be lower than that of the brush unit 51 if a smooth floor surface is cleaned. Therefore, a larger amount of current may be supplied so as to make the rotating velocity of the brush unit 51 uniform.

The dust container 60 is mounted on the rear portion of the main body 11. An inflow hole 64 of the dust container 60 is communicated with the dust inflow channel 50*a* of the brush drum unit 50. Thus, dust swept by the brush unit 51 passes through the dust inflow channel 50*a*, and is then stored in the dust container 60.

The dust container 60 is divided into a large dust container space 61 and a small dust container space 62 by a diaphragm 63. Therefore, the inflow hole 64 is divided into a first inflow hole 64*a* provided at the inlet of the large dust container space 61 and a second inflow hole 64*b* provided at the inlet of the small dust container space 62.

The brush unit 51 sweeps dust having relatively large particles into the large dust container space 61, and an air blowing unit 52 sucks dust having relatively small particles and stores the sucked dust into the small dust container space 62. Particularly, a brush cleaning member 59 is provided at a position adjacent to the second inflow hole 64*b*, and filters off hairs wound on the brush unit 51. The hairs filtered off by the brush cleaning member 59 are stored in the small dust container space 62 by suction force of the air blowing unit 52.

Further, a dust amount sensing unit 65 to sense whether or not the dust container 60 is fully filled with dust is provided in the dust container 60. The dust amount sensing unit 65 includes a light emitting part 65*a* to emit a beam and a light receiving part 65*b* to receive the beam. If an amount of the beam received by the light receiving part 65*b* is lowered to a designated value or less, the dust amount sensing unit 65 determines that the dust container 60 is fully filled with dust.

The brush drum unit 50, the side brush unit 51 and the dust container 60 may be integrated into one assembly which is detachably mounted on the main body 11.

The various sensors 12 and 13 include a proximity sensor 12 and/or a vision sensor 13. For example, if the robot cleaner 10 travels in an arbitrary direction without a set route, i.e., in a cleaning system without a map, the robot cleaner 10 may travel in a region to be cleaned using the proximity sensor 12. On the other hand, if the robot cleaner 10 travels along a set route, i.e., in a cleaning system requiring a map, the vision sensor 13 to receive position data of the robot cleaner 10 and to generate the map may be installed. The vision sensor 13 is an example of a position recognition system, and may be implemented in various types.

The display unit 14 displays various states of the robot cleaner 10. For example, the display unit 14 displays a battery charging state, whether or not the dust container 60 is fully filled with dust, a cleaning mode of the robot cleaner 10, a resting mode of the robot cleaner 10 and so on.

The control unit (not shown) controls the drive unit 20 and the cleaning unit 30 so as to efficiently perform a cleaning task. The control unit receives signals from the various sensors 12 and 13, and is capable of avoiding an obstacle and changing a traveling mode.

Further, the control unit receives a signal from the dust amount sensing unit 65, and when it is determined that the dust container 60 is fully filled with dust, docks with a maintenance station (not shown) so as to automatically remove the dust from the dust container 60 or provide an alarm to a user.

Moreover, the control unit receives a signal from the dust inflow sensing unit 70, and divisionally cleans an area from which dust flows into the robot cleaner 10 and an area from which dust does not flow into the robot cleaner 10. For example, the control unit repeats traveling and decreases the traveling velocity of the robot cleaner 10 or increases rotating force of the brush unit 51 or suction force of the air blowing unit 52 in the area from which dust flows into the robot cleaner 10, thereby increasing cleaning efficiency. On the other hand, the control unit lowers the order of priority of cleaning or reduces the number of frequency of traveling in the area from which dust does not flow into the robot cleaner 10.

Figure 4:
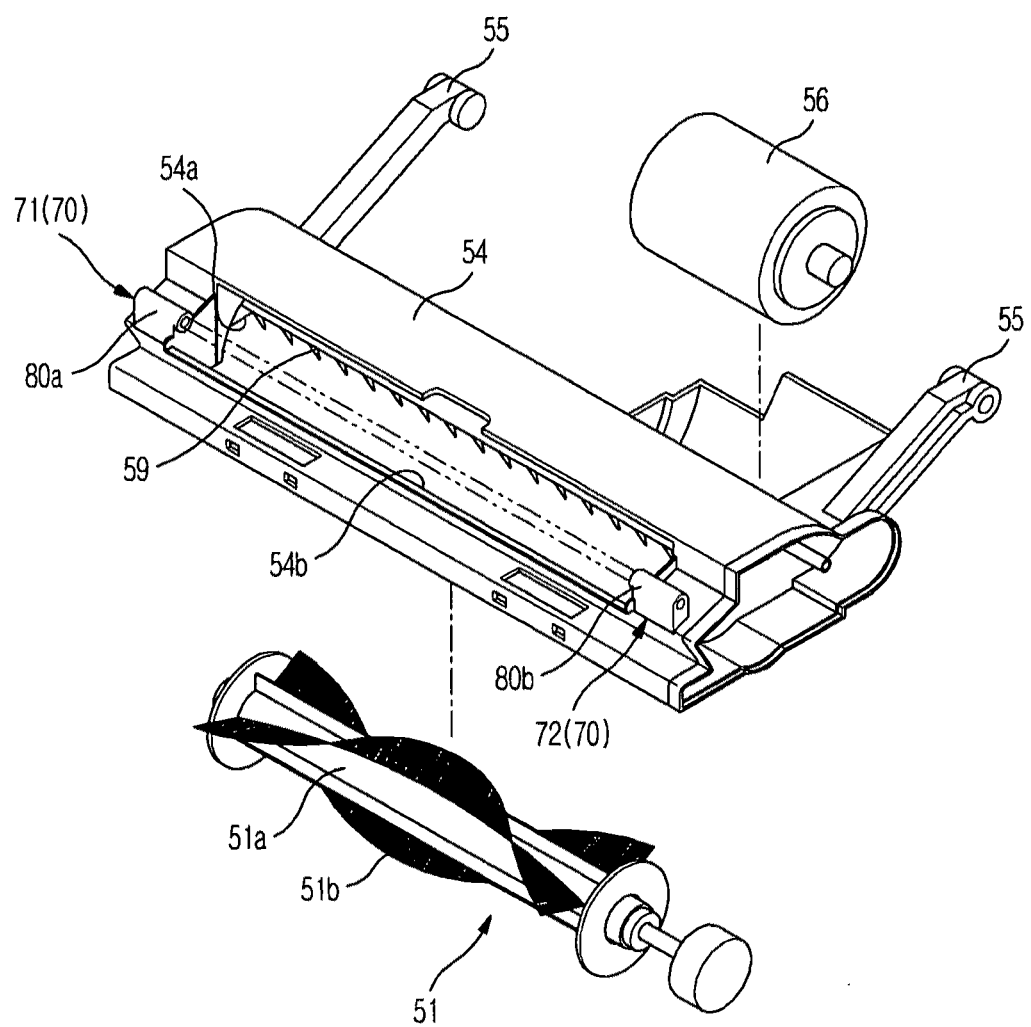
FIG. 4 is an exploded perspective view of a brush drum unit in accordance with the embodiment.
Figure 5:
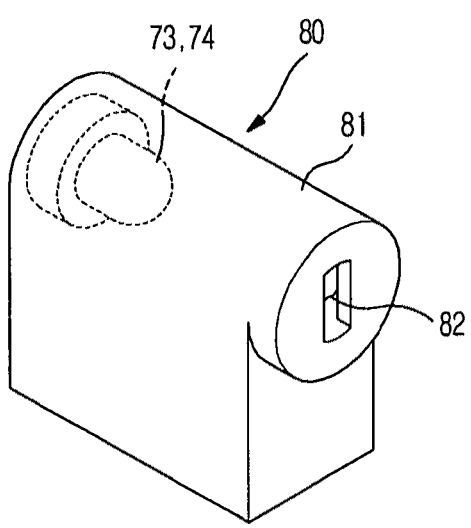
FIG. 5 is an enlarged perspective view of a guide member in accordance with the embodiment.

FIG. 4 is an exploded perspective view of the brush drum unit in accordance with the embodiment and FIG. 5 is an enlarged perspective view of a guide member in accordance with the embodiment.

As shown in FIGS. 1 to 5, the brush drum unit 50 includes a housing 54, the motor 56, the brush unit 51 and the dust inflow sensing unit 70.

The housing 54 is formed in an about semi-cylindrical shape. A first opening 54*a* is formed on the bottom surface of the housing 54, and a second opening 54*b* communicated with the dust container 60 is formed on the upper surface of the housing 54. The dust inflow channel 50*a* may be a route along which dust moves from the first opening 54*a* to the second opening 54*b*.

The housing 54 is detachably installed on the main body 11. Particularly, rotary arms 55 of the housing 54 causes the housing 54 to be tilted with respect to the main body 11. For example, if the robot cleaner 10 travels on a smooth floor surface having small frictional force with the brush unit 51, for example, such as a wooden floor, the robot cleaner 10 travels under the condition that the housing 54 is lowered, and if the robot cleaner 10 travels on a floor surface having large frictional force with the brush unit 51, for example, such as a carpet, the robot cleaner 10 travels under the condition that the housing 54 is tilted upwards. Here, since the brush unit 51 is tilted upwards, a load of the motor 56 may be reduced.

The motor 56 is installed on the housing 54. The motor 56 provides power to the brush unit 51.

The brush unit 51 is rotatably installed on the housing 54. The brush unit 51 is rotated by power supplied from the motor 56.

The dust inflow sensing unit 70 determines whether or not dust flows into the dust inflow channel 50*a* of the housing 54, or an amount of inflow dust. The control unit determines whether or not the robot cleaner 10 properly performs cleaning through the operation of the dust inflow sensing unit 70, and determines which area requires more cleaning.

The dust inflow sensing unit 70 includes a light emitting part 71 and a light receiving part 72. The light emitting part 71 and the light receiving part 72 may be installed at a position adjacent to the second opening 54*b* of the housing 54 such that the light emitting part 71 and the light receiving part 72 are opposite to each other. Otherwise, the light emitting part 71 and the light receiving part 72 may be installed at a position adjacent to the inflow hole 64 of the dust container 60 connected with the second opening 54*b* such that the light emitting part 71 and the light receiving part 72 are opposite to each other.

The light emitting part 71 includes a light emitting element 73 to emit a beam having a designated transmission region, and a light emitting guide member 80*a* to restrict the transmission region of the light emitting element 73 to a designated range. The light emitting guide member 80*a* restricts the width of the transmission region of the light emitting element 73 to the designated range. The width of the transmission region of the light emitting element 73 may be restricted to a focus within a designated size.

The light receiving part 72 includes a light receiving element 74 intersecting (or overlapping) the transmission region of the light emitting element 73 and having a designated reception region, and a light receiving guide member 80*b* to restrict the reception region of the light receiving element 74 to a designated range. The light receiving guide member 80*b* restricts the width of the reception region of the light receiving element 74 to the designated range. The width of the reception region of the light receiving element 74 may be restricted to a focus within a designated size.

Here, terms of the light emitting guide member 80*a* and the light receiving guide member 80*b* are discriminated for convenience of description but the functions and shapes of the light emitting guide member 80*a* and the light receiving guide member 80*b* are the same. Therefore, the light emitting guide member 80*a* and the light receiving guide member 80*b* will be commonly referred to as a guide member 80 except for the case in that the discrimination therebetween is needed.

The guide member 80 includes a case 81 to receive the light emitting element 73 or the light receiving element 74, and a through hole 82 formed on the case 81. In the case of the light emitting guide member 80*a*, the through hole 82 is formed toward the light receiving part 72, and in the case of the light receiving guide member 80*b*, the through hole 82 is formed toward the light emitting part 71. Here, the through hole 82 may be formed in various shapes, such as a slit and a circle.

Figure 6:
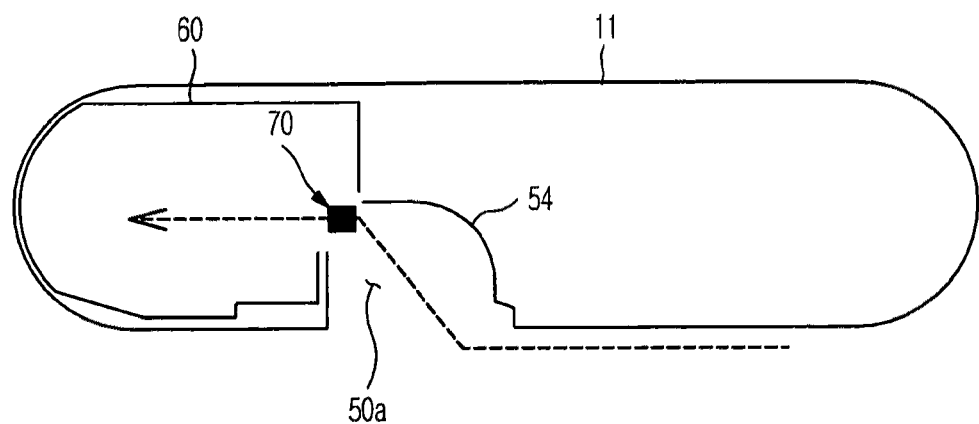
FIG. 6 is a schematic view illustrating inflow of dust into the robot cleaner in accordance with the embodiment.
Figure 7:
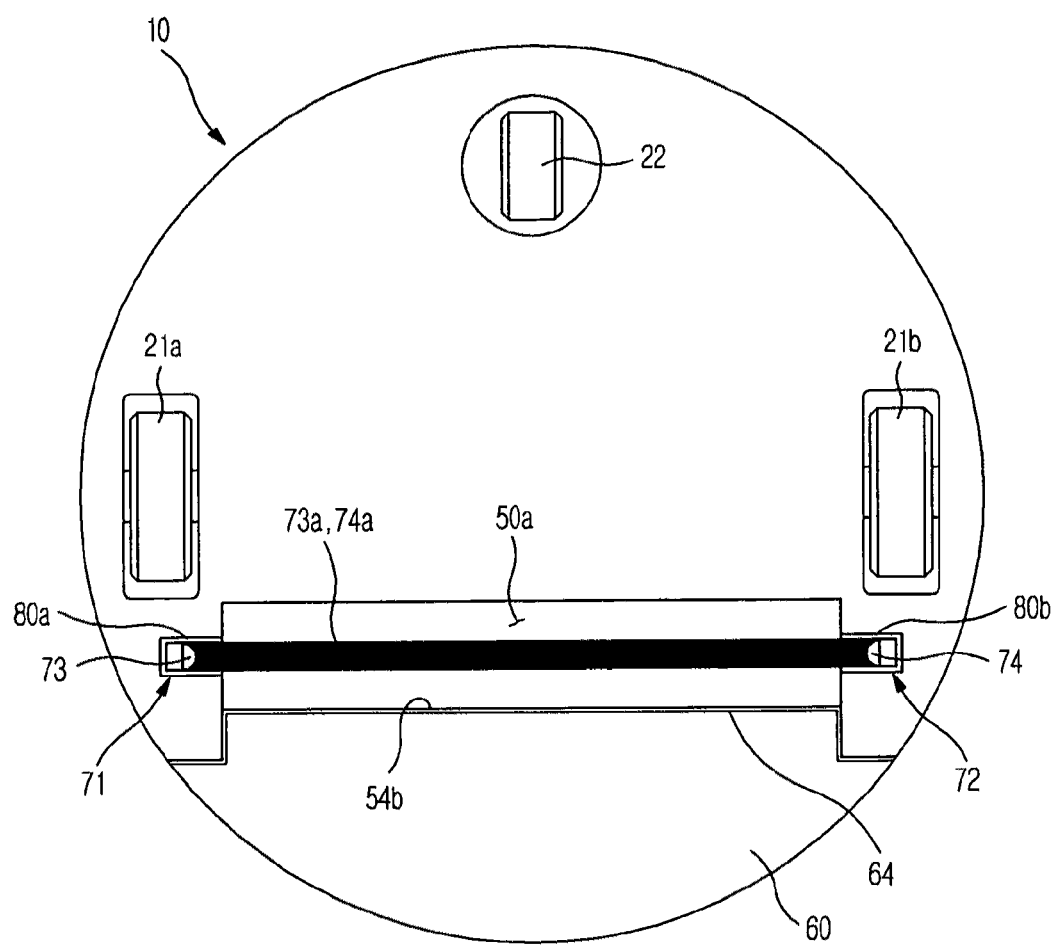
FIG. 7 is a schematic view illustrating an operation of a dust inflow sensing unit in accordance with the embodiment.

FIG. 6 is a schematic view illustrating inflow of dust into the robot cleaner in accordance with the embodiment and FIG. 7 is a schematic view illustrating an operation of the dust inflow sensing unit in accordance with the embodiment.

As shown in FIGS. 1 to 7, the width of the transmission region 73*a* of the light emitting element 73 is restricted by the guide member 80. Here, the width of the transmission region 73*a* of the light emitting element 73 may be nearly uniformly maintained in a direction toward the light receiving element 74. Further, the width of the transmission region 73*a* of the light emitting element 73 may be substantially equal to the width of the reception region 74*a* of the light receiving element 74 at a position at which the light receiving element 74 is located.

Further, the width of the reception region 74*a* of the light receiving element 74 is restricted by the guide member 80. Here, the width of the reception region 74*a* of the light receiving element 74 may be nearly uniformly maintained in a direction toward the light emitting element 73. Further, the width of the reception region 74*a* of the light receiving element 74 may be substantially equal to the width of the transmission region 73*a* of the light emitting element 73 at a position at which the light emitting element 73 is located.

Through such a guide structure, the light receiving element 74 may be blocked from external light or scattered light and the beam emitted by the light emitting element 73 may be directly incident upon the light receiving element 74 by the guide members 80 without reflection by a surrounding structure. Thus, sensitivity of the light receiving element 74 may be greatly increased. When an overlapping area between the reception region 74*a* of the light receiving element 74 and the transmission region 73*a* of the light emitting element 73 is greatly reduced in this way, an amount of light received by the light receiving element 74 is greatly varied according to whether or not dust flows into the dust inflow channel 50*a* of the housing 54 or an amount of inflow dust. For example, if dust does not flow into the dust inflow channel 50*a*, the amount of light received by the light receiving element 74 is generally uniform, and if dust flows into the dust inflow channel 50*a*, the amount of light received by the light receiving element 74 is considerably reduced. Such a difference in the amount of light received by the light receiving element 74 may be also generated even if there is a difference in the amount of inflow dust. Accordingly, the dust inflow sensing unit 70 increases sensitivity of the light receiving element 74 through the simple guide structure, thereby exactly measuring whether or not dust flows into the dust inflow channel 50*a* or the amount of inflow dust.

Figure 8:
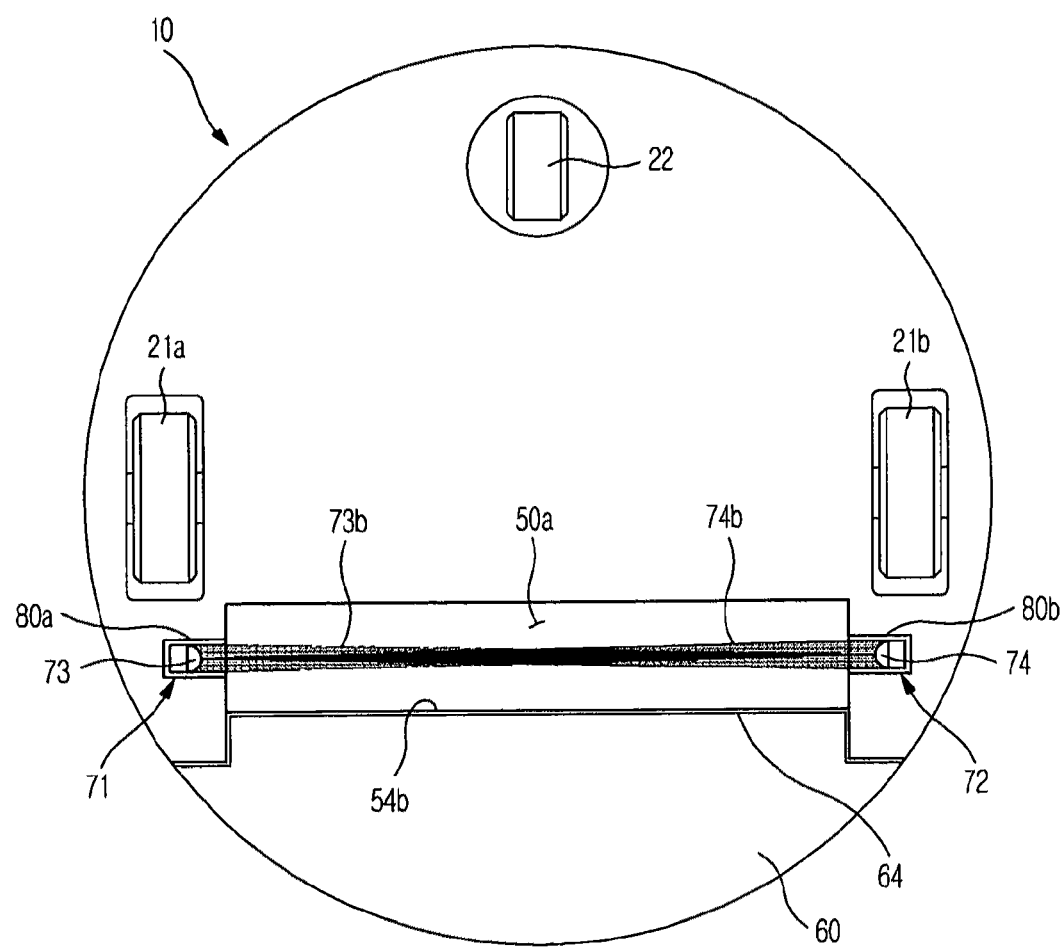
FIG. 8 is a schematic view illustrating an operation of a dust inflow sensing unit in accordance with another embodiment.

FIG. 8 is a schematic view illustrating an operation of a dust inflow sensing unit in accordance with another embodiment of the present invention.

Only some parts in this embodiment shown in FIG. 8, which are different from those in the embodiment shown in FIG. 7, will be described.

As shown in FIG. 8, the width of a transmission region 73*b* of a light emitting element 73 is gradually decreased in a direction toward a light receiving element 74 by a light emitting guide member 80*a*. Here, the width of the transmission region 73*b* of the light emitting element 73 is smaller than the width of a reception region 74*b* of the light receiving element 74 at a position at which the light receiving element 74 is located. Further, the width of the reception region 74*b* of the light receiving element 74 is gradually decreased in a direction toward the light emitting element 73 by a light receiving guide member 80*b*. Here, the width of the reception region 74*b* of the light receiving element 74 is smaller than the width of the transmission region 73*b* of the light transmitting element 73 at a position at which the light emitting element 73 is located.

Consequently, the light emitting guide member 80*a* restricts the transmission region 73*b* of the light emitting element 73 to a designated range, and the light receiving guide member 80*b* restricts the reception region 74*b* of the light receiving element 74 to a designated range. Through such a guide structure, the light receiving element 74 may be blocked from external light or scattered light and the beam emitted by the light emitting element 73 may be directly incident upon the light receiving element 74 by the guide members 80 without reflection by a surrounding structure. Thus, sensitivity of the light receiving element 74 may be greatly increased.

Figure 9:
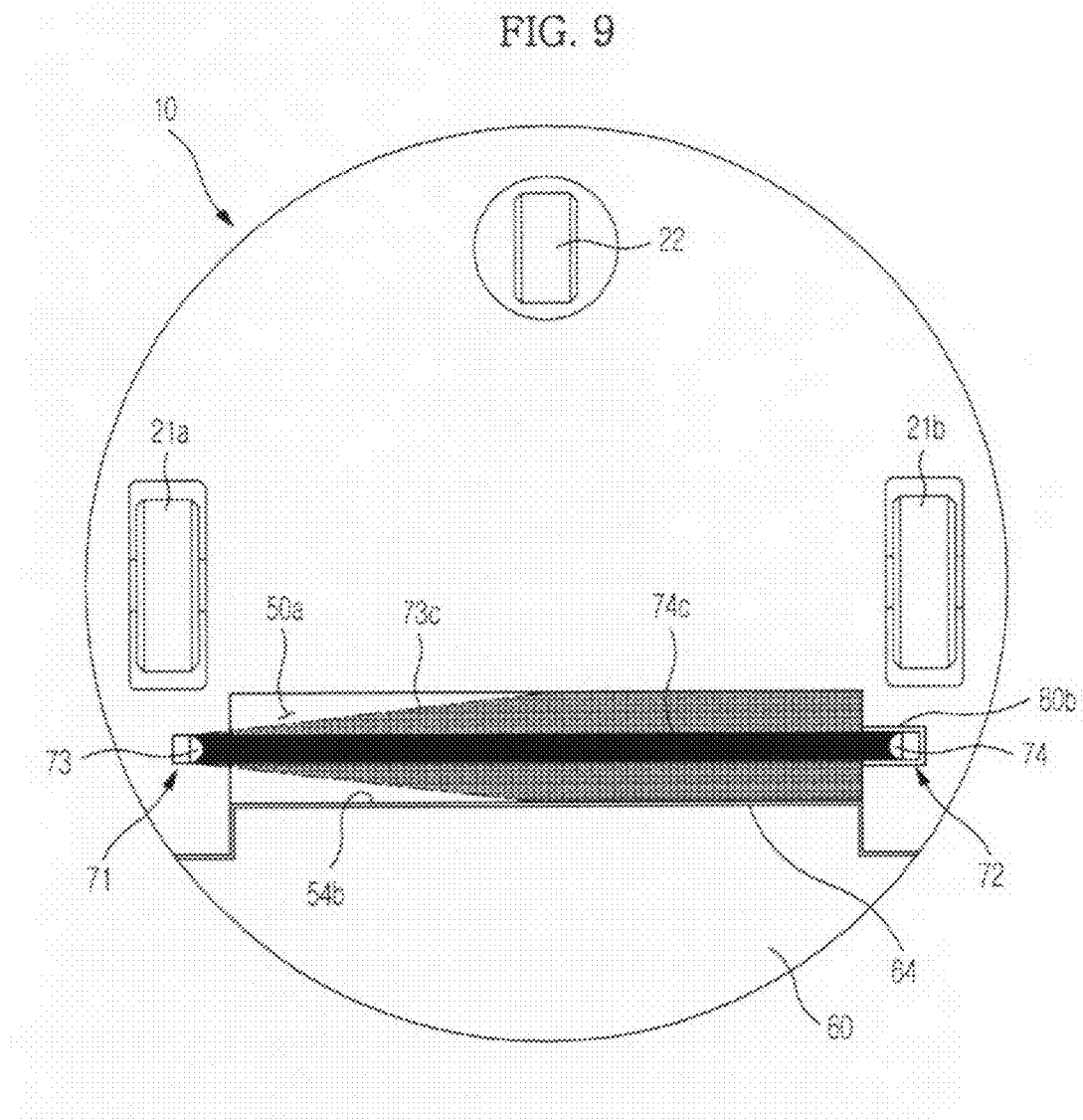
FIG. 9 is a schematic view illustrating an operation of a dust inflow sensing unit in accordance with another embodiment.

FIG. 9 is a schematic view illustrating an operation of a dust inflow sensing unit in accordance with another embodiment.

Only some parts in this embodiment shown in FIG. 9, which are different from those in the embodiments shown in FIGS. 7 and 8, will be described.

As shown in FIG. 9, a light emitting part 71 includes a light emitting element 73, and a light receiving part 72 includes a light receiving element 74 and a light receiving guide member 80*b* to restrict a reception region 74*c* of the light receiving element 74.

The width of a transmission region 73c of the light emitting element 73 is suddenly or rapidly increased in a direction toward the light receiving element 74 because there is no guide structure to restrict the transmission region 73c of the light emitting element 73. On the other hand, the width of the reception region 74c of the light receiving element 74 is restricted by the light receiving guide member 80b, thus being capable of being uniformly maintained. Even in this case, an overlapping (or intersecting) area between the transmission region 73c of the light emitting element 73 and the reception region 74c of the light receiving element 74 is greatly reduced, and thus sensitivity of the light receiving element 74 may be increased.

Figure 10:
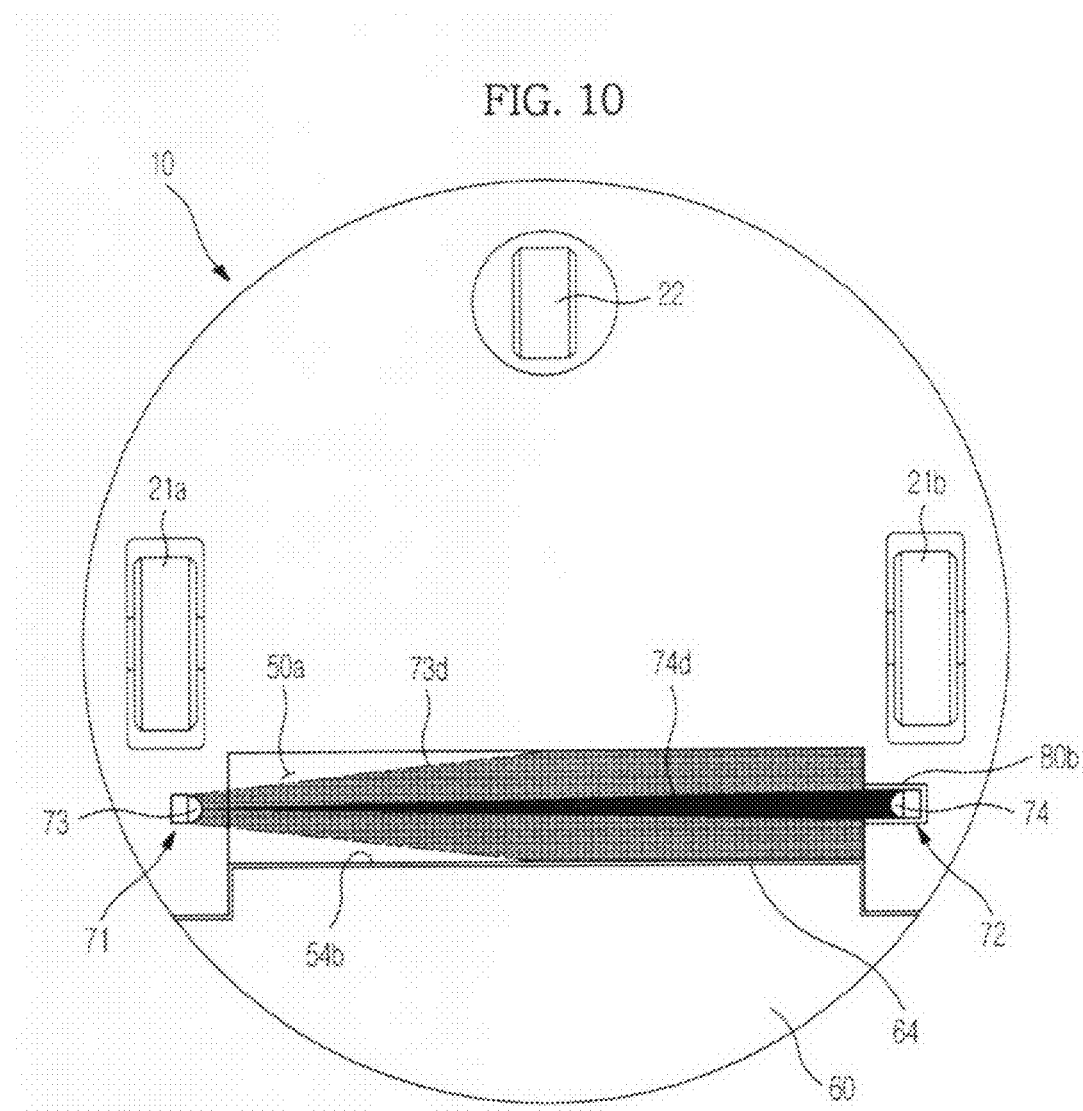
FIG. 10 is a schematic view illustrating an operation of a dust inflow sensing unit in accordance with another embodiment.

FIG. 10 is a schematic view illustrating an operation of a dust inflow sensing unit in accordance with another embodiment.

Only some parts in this embodiment shown in FIG. 10, which are different from those in the embodiments shown in FIGS. 7 to 9, will be described.

As shown in FIG. 10, a light emitting part 71 includes a light emitting element 73, and a light receiving part 72 includes a light receiving element 74 and a light receiving guide member 80b to restrict a reception region 74d of the light receiving element 74.

The width of a transmission region 73d of the light emitting element 73 is suddenly or rapidly increased in a direction toward the light receiving element 74 because there is no guide structure to restrict the transmission region 73d of the light emitting element 73. On the other hand, the width of the reception region 74d of the light receiving element 74 is gradually decreased in a direction toward the light emitting element 73 by the light receiving guide member 80b. Even in this case, an overlapping (or intersecting) area between the transmission region 73d of the light emitting element 73 and the reception region 74d of the light receiving element 74 is greatly reduced, and thus sensitivity of the light receiving element 74 may be increased.

Consequently, in the embodiments shown in FIGS. 9 and 10 differently from the embodiments shown in FIGS. 7 and 8, only the reception region of the light receiving element 74 is restricted to a designated range so as to reduce the overlapping area between the transmission region of the light emitting element 73 and the reception region of the light receiving element 74, thereby blocking external light or scattered light, thus being capable of increasing reception sensitivity of the light receiving element 74.

Figure 11:
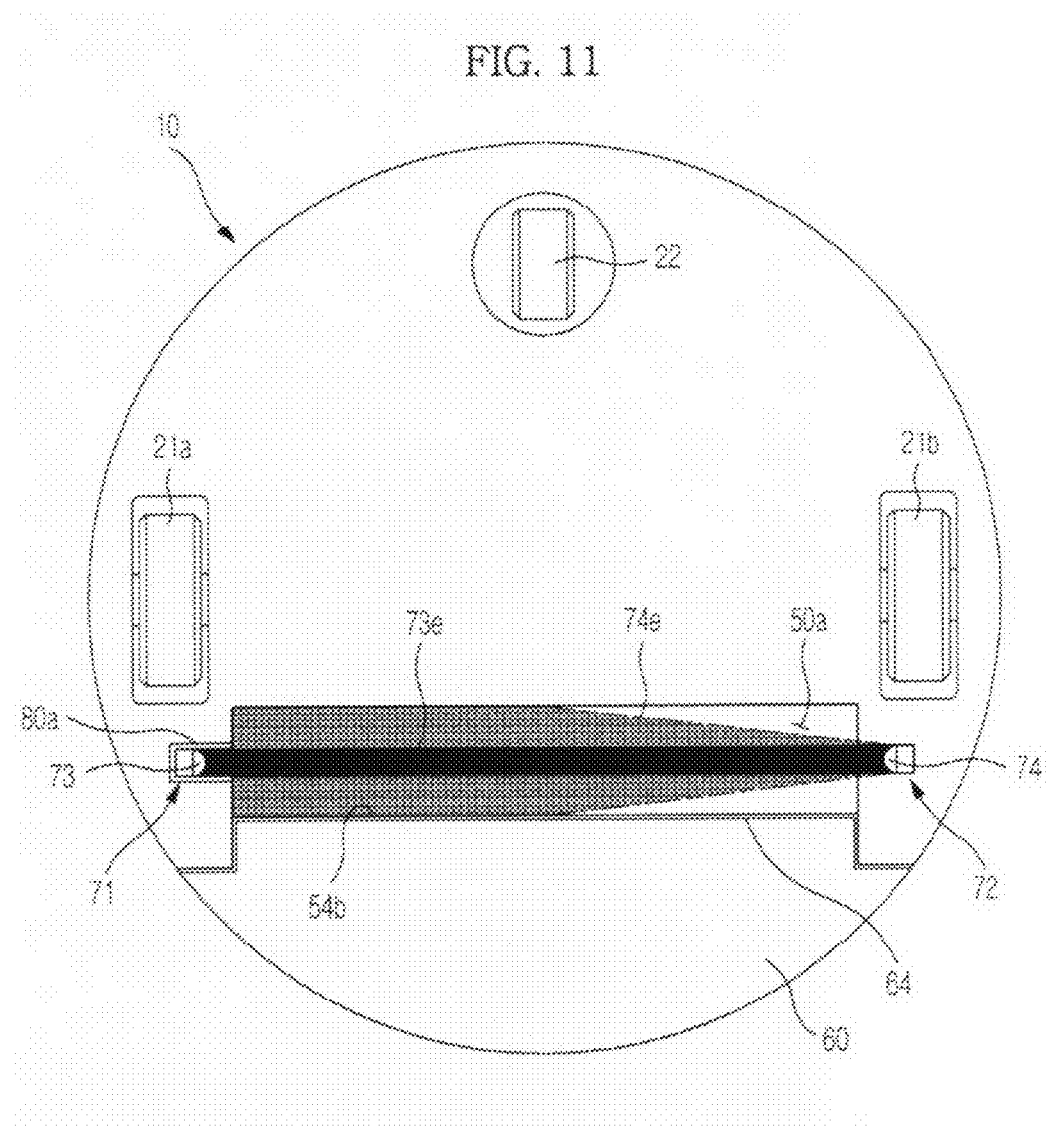
FIG. 11 is a schematic view illustrating an operation of a dust inflow sensing unit in accordance with another embodiment.

FIG. 11 is a schematic view illustrating an operation of a dust inflow sensing unit in accordance with another embodiment.

Only some parts in this embodiment shown in FIG. 11, which are different from those in the embodiments shown in FIGS. 7 to 10, will be described.

As shown in FIG. 11, a light emitting part 71 includes a light emitting element 73 and a light emitting guide member 80a to restrict a transmission region 73e of the light emitting element 73, and a light receiving part 72 includes a light receiving element 74.

The width of the transmission region 73e of the light emitting element 73 is uniformly maintained in a direction toward the light receiving element 74 by the light emitting guide member 80a. On the other hand, the width of a reception region 74e of the light receiving element 74 is suddenly or rapidly increased in a direction toward the light emitting element 73 because there is no guide structure to restrict the reception region 74e of the light receiving element 74. Even in this case, an overlapping (or intersecting) area between the transmission region 73e of the light emitting element 73 and the reception region 74e of the light receiving element 74 is greatly reduced, and thus sensitivity of the light receiving element 74 may be increased.

Further, in accordance with another embodiment, the width of the transmission region 73e may be gradually decreased in a direction toward the light receiving element 74 by the light emitting guide member 80a. Even in this case, an overlapping (or intersecting) area between the transmission region 73e of the light emitting element 73 and the reception region 74e of the light receiving element 74 is greatly reduced, and thus sensitivity of the light receiving element 74 may be increased.

Figure 12:
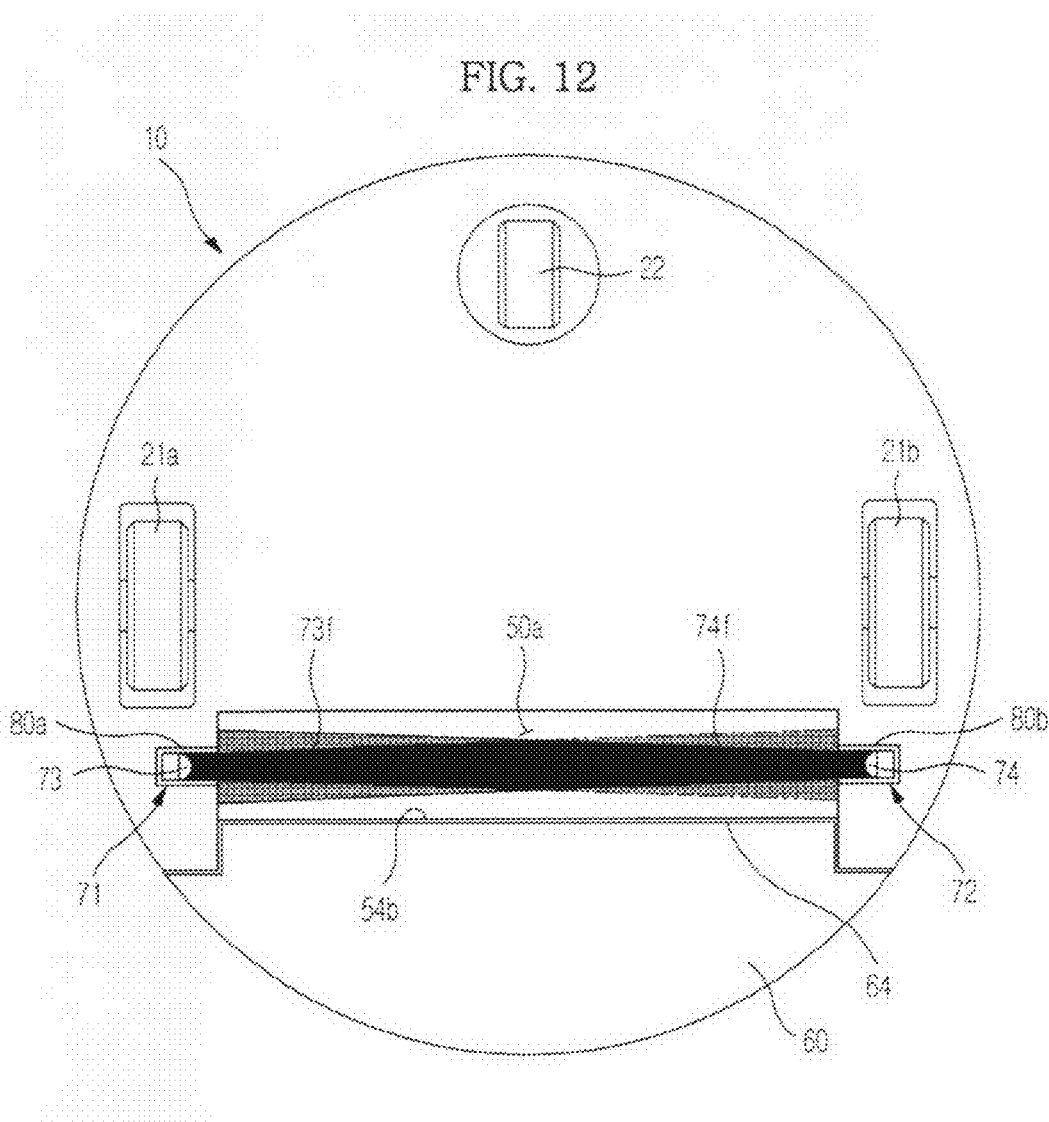
FIG. 12 is a schematic view illustrating an operation of a dust inflow sensing unit in accordance with another embodiment.

FIG. 12 is a schematic view illustrating an operation of a dust inflow sensing unit in accordance with another embodiment of the present invention.

Only some parts in this embodiment shown in FIG. 12, which are different from those in the embodiments shown in FIGS. 7 to 11, will be described.

As shown in FIG. 12, a light emitting part 71 includes a light emitting element 73 and a light emitting guide member 80a to restrict a transmission region 73f of the light emitting element 73, and a light receiving part 72 includes a light receiving element 74 and a light receiving guide member 80b to restrict a reception region 74f of the light receiving element 74.

The width of the transmission region 73f of the light emitting element 73 is gradually increased in a direction toward the light receiving element 74 by the light emitting guide member 80a. Here, the width of the transmission region 73f may be slightly greater than that of the reception region 74f of the light receiving element 74 at a position at which the light receiving element 74 is located. On the other hand, the width of the reception region 74f of the light receiving element 74 is gradually increased in a direction toward the light emitting element 73 by the light receiving guide member 80b. Here, the width of the reception region 74f may be slightly greater than that of the transmission region 73f of the light emitting element 73 at a position at which the light emitting element 73 is located.

Even in this case, most of a beam emitted by the light emitting element 73 may be directly incident upon the light receiving element 74 without reflection by a surrounding structure. Further, an overlapping (or intersecting) area between the transmission region 73f of the light emitting element 73 and the reception region 74f of the light receiving element 74 is greatly reduced, and thus sensitivity of the light receiving element 74 may be increased.

Further, in accordance with another embodiment, if the width of the transmission region 73f of the light emitting element 73 is uniformly maintained or gradually decreased in a direction toward the light receiving element 74 by the light emitting guide member 80a, the same effect may be obtained. Further, if the width of the transmission region 73f of the light emitting element 73 is suddenly or rapidly increased due to no separate guide structure, the same effect may be obtained.

Moreover, in accordance with another embodiment, if the width of the reception region 74f of the light receiving element 74 is uniformly maintained or gradually decreased in a direction toward the light emitting element 73 by the light receiving guide member 80b, the same effect may be obtained. Further, if the width of the reception region 74f of the light receiving element 74 is suddenly or rapidly increased due to no separate guide structure, the same effect may be obtained.

Hereinafter, an operation of the robot cleaner having the dust inflow sensing unit will be described in detail.

Figure 13:
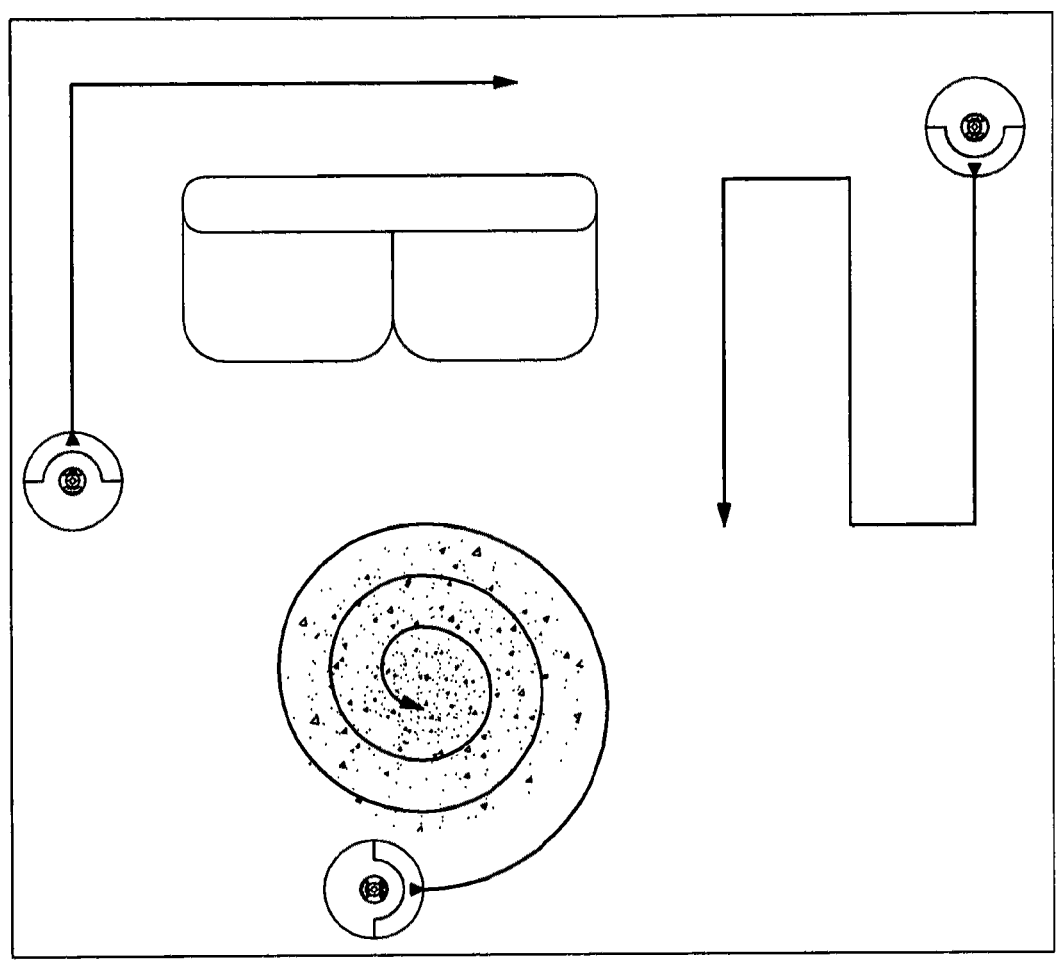
FIG. 13 is a view illustrating an operation of the robot cleaner in a cleaning system without a map in accordance with one embodiment.
Figure 14:
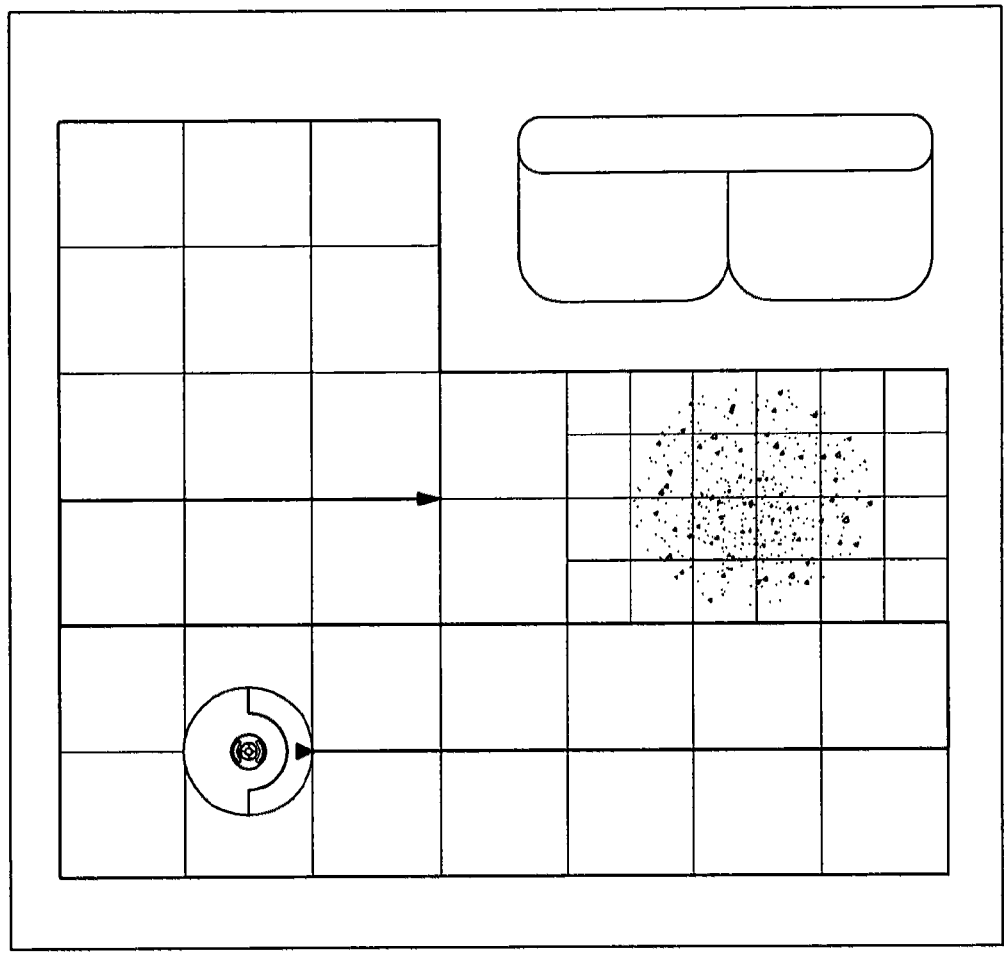
FIG. 14 is a view illustrating an operation of the robot cleaner in a cleaning system with a map in accordance with another embodiment.

FIG. 13 is a view illustrating an operation of the robot cleaner in a cleaning system without a map in accordance with one embodiment and FIG. 14 is a view illustrating an operation of the robot cleaner in a cleaning system with a map in accordance with another embodiment.

As shown in FIGS. 1 to 14, the robot cleaner 10 performs a cleaning task while autonomously traveling in a region to be cleaned. A travel pattern of the robot cleaner 10 may be variously implemented. For example, as shown in FIG. 13, the robot cleaner 13 may travel in various travel patterns, such as a zigzag travel pattern, a random travel pattern, a spiral travel pattern, a wall following travel pattern and so on. Further, as shown in FIG. 14, the robot cleaner 13 may travel along a set route by recognizing position data using a vision system and then generating a map of a region to be cleaned.

The control unit may change the travel pattern of the robot cleaner 10 so that the robot cleaner 10 efficiently performs cleaning. That is, the control unit divides the region into an area from which dust flows into the robot cleaner 10 and an area from which dust does not flow into the robot cleaner 10 using a signal received from the dust inflow sensing unit 70.

For example, if the dust inflow sensing unit 70 senses dust inflow while the robot cleaner 10 in the cleaning system of FIG. 13 travels in an arbitrary travel pattern, such as the zigzag travel pattern or the random travel pattern, the control unit controls the robot cleaner 10 in the area from which dust flows into the robot cleaner 10 so as to travel in the spiral travel pattern and to increase an amount of rotation of the brush unit 51 or an amount of air sucked by the air blowing unit 52.

On the other hand, if the dust inflow sensing unit 70 senses dust inflow while the robot cleaner 10 in the cleaning system of FIG. 14 travels along the set map, the control unit modifies the map so as to allow the robot cleaner 10 repeatedly travel in the area from which dust flows into the robot cleaner 10 or to decrease a travel interval. Further, the control unit increases an amount of rotation of the brush unit 51 or an amount of air sucked by the air blowing unit 52, and changes a travel velocity of the robot cleaner 10. Further, the control unit causes the robot cleaner 10 to give priority to the area in which dust is sensed so as to clean the area first, and to subsequently clean the area in which dust is not sensed.

Consequently, the dust inflow sensing unit 70 in accordance with this embodiment exactly determines whether or not dust flows into the dust inflow channel 50a or the amount of inflow dust. Therefore, the robot cleaner 10 having the dust inflow sensing unit 70 divides a region to be cleaned into an area from which dust flows into the robot cleaner 10 and an area from which dust does not flow into the robot cleaner 10, thereby increasing cleaning efficiency more. Further, the robot cleaner 10 divisionally cleans the area from which dust flows into the robot cleaner 10 and the area from which dust does not flow into the robot cleaner 10, thereby increasing cleaning efficiency and reducing a cleaning time.

As is apparent from the above description, a robot cleaner in accordance with one embodiment exactly determines whether or not dust flows into the robot cleaner.

Further, the robot cleaner divisionally cleans a region to be cleaned according to whether or not dust flows into the robot cleaner, thereby increasing cleaning efficiency and reducing a cleaning time.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A robot cleaner, comprising:
   a main body;
   a drive unit to drive the main body;
   a brush drum unit provided on the main body to form a dust inflow channel; and
   a dust inflow sensing unit to sense dust flowing into the main body through the dust inflow channel of the brush drum unit, the dust inflow sensing unit including:
      a light emitting part having a transmission region to emit a beam, and
      a light receiving part having a reception region to overlap the transmission region and the reception region is restricted to a designated range, the light receiving part including a light receiving element and a light receiving guide member to restrict the reception region of the light receiving element,
   wherein the light receiving guide member enables a width of the reception region of the light receiving element to be gradually decreased in a direction toward the light emitting part.

2. The robot cleaner according to claim 1, wherein:
   the brush drum unit includes a housing having a first opening and a second opening so as to form the dust inflow channel; and
   the light emitting part and the light receiving part are installed in the second opening so as to be opposite to each other.

3. The robot cleaner according to claim 1, further comprising a dust container provided with an inflow hole to store the dust flowing into the main body through the dust inflow channel of the brush drum unit, and
   the light emitting part and the light receiving part are installed in the inflow hole so as to be opposite to each other.

4. The robot cleaner according to claim 1, wherein a width of the reception region of the light receiving part is smaller than that of the transmission region of the light emitting part at a position at which the light emitting part is located.

5. The robot cleaner according to claim 1, further comprising a control unit to determine an area in which dust is sensed by the dust inflow sensing unit and an area in which dust is not sensed by the dust inflow sensing unit,
   wherein the control unit controls the robot cleaner so as to divisionally clean the area in which dust is sensed by the dust inflow sensing unit and the area in which dust is not sensed by the dust inflow sensing unit.

6. The robot cleaner according to claim 1, further comprising a control unit to determine an area in which dust is sensed by the dust inflow sensing unit and an area in which dust is not sensed by the dust inflow sensing unit,
   wherein the control unit controls the robot cleaner so as to repeatedly clean the area in which dust is sensed by the dust inflow sensing unit more than the area in which dust is not sensed by the dust inflow sensing unit.

7. The robot cleaner according to claim 1, further comprising a control unit to determine an area in which dust is sensed by the dust inflow sensing unit and an area in which dust is not sensed by the dust inflow sensing unit, wherein:
   the brush drum unit includes a brush unit provided in the dust inflow channel; and
   the control unit increases rotary force of the brush unit in the area in which dust is sensed by the dust inflow sensing unit.

8. The robot cleaner according to claim 1, further comprising:
- an air blowing unit to provide suction force to the dust inflow channel of the brush drum unit; and
- a control unit to determine an area in which dust is sensed by the dust inflow sensing unit and an area in which dust is not sensed by the dust inflow sensing unit,
- wherein the control unit increases suction force of the air blowing unit in the area in which dust is sensed by the dust inflow sensing unit.

9. A robot cleaner comprising:
- a main body;
- a drive unit to drive the main body;
- a brush drum unit provided on the main body to form a dust inflow channel; and
- a dust inflow sensing unit to sense dust flowing into the main body through the dust inflow channel of the brush drum unit, the dust inflow sensing unit including:
  - a light emitting part having a transmission region to emit a beam, and
  - a light receiving part having a reception region to overlap the transmission region and the reception region is restricted to a designated range, the light receiving part including a light receiving element and a light receiving guide member to restrict the reception region of the light receiving element,
- wherein the light receiving guide member enables a width of the reception region of the light receiving part to be uniformly maintained in a direction toward the light emitting part.

10. The robot cleaner according to claim 9, wherein the width of the reception region of the light receiving part is equal to that of the transmission region of the light emitting part at a position at which the light emitting part is located.

11. A robot cleaner comprising:
- a main body;
- a drive unit to drive the main body;
- a brush drum unit provided on the main body to form a dust inflow channel; and
- a dust inflow sensing unit to sense dust flowing into the main body through the dust inflow channel of the brush drum unit, the dust inflow sensing unit including:
  - a light emitting part having a transmission region to emit a beam, and
  - a light receiving part having a reception region to overlap the transmission region and the reception region is restricted to a designated range, the light receiving part including a light receiving element and a light receiving guide member to restrict the reception region of the light receiving element,
- wherein the guide member enables a width of the reception region of the light receiving part to be gradually increased in a direction toward the light emitting part.

12. The robot cleaner according to claim 11, wherein the width of the reception region of the light receiving part is greater than that of the transmission region of the light emitting part at a position at which the light emitting part is located.

* * * * *